US 6,532,848 B1

(12) United States Patent
DeRegnaucourt et al.

(10) Patent No.: US 6,532,848 B1
(45) Date of Patent: Mar. 18, 2003

(54) METHOD FOR PRODUCING AND BALANCING A BRAKE DRUM

(75) Inventors: Robert A. DeRegnaucourt, Lewisburg, OH (US); Kenneth D. Mutzner, Dayton, OH (US)

(73) Assignee: Meritor Heavy Vehicle Systems LLC., Troy, MI (US)

( * ) Notice: Subject to any disclaimer, the term of this patent is extended or adjusted under 35 U.S.C. 154(b) by 0 days.

(21) Appl. No.: 09/482,398

(22) Filed: Jan. 12, 2000

Related U.S. Application Data
(60) Provisional application No. 60/115,723, filed on Jan. 12, 1999.

(51) Int. Cl.[7] .............................. B23B 1/00; B23B 5/04
(52) U.S. Cl. .............................. 82/1.11; 82/112; 82/903
(58) Field of Search .............................. 82/1.11, 46, 47, 82/112, 113, 903; 188/218 R; 74/573 R

(56) References Cited

U.S. PATENT DOCUMENTS

| 4,067,098 A | * | 1/1978 | Blair, Jr. ...................... 29/558 |
| 4,428,697 A | * | 1/1984 | Ruland ........................ 403/290 |
| 4,836,755 A | * | 6/1989 | Nitsche et al. ......... 29/888.021 |
| 4,926,341 A | * | 5/1990 | Guyot ........................ 364/508 |
| 5,483,855 A | * | 1/1996 | Julow et al. ................. 82/1.11 |
| 5,586,625 A | * | 12/1996 | Julow et al. ............ 188/218 R |
| 5,782,324 A | * | 7/1998 | Wall ....................... 188/218 R |
| 6,112,398 A | * | 9/2000 | Messina .................... 29/527.6 |
| 6,196,363 B1 | * | 3/2001 | Wall ....................... 188/218 R |

* cited by examiner

Primary Examiner—Henry Tsai
(74) Attorney, Agent, or Firm—Carlson Gaskey & Olds

(57) ABSTRACT

An improved method for producing a brake drum which balances a brake drum defining an inner surface and an axis. Balancing specifications are determined which correct an imbalance of the brake drum about the axis. Material is removed from the inner surface, which forms a cylindrical surface preferably defining a braking surface of the brake drum, to balance the brake drum according to the balancing specifications. It is a further feature of the invention to remove material surrounding a pilot hole initially formed in the brake drum, wherein the removal of the material also correlates to the balancing specifications.

20 Claims, 4 Drawing Sheets

METHOD FOR PRODUCING AND BALANCING A BRAKE DRUM

This application claims the benefit of provisional application No. 60/115,723, filed Jan. 12, 1999.

BACKGROUND OF THE INVENTION

This invention relates in general to brake drums and in particular to an improved method for balancing a brake drum.

Most vehicles are equipped with a brake system for slowing or stopping movement of the vehicle in a controlled manner. A typical brake system includes either a disc brake assembly or a drum brake assembly for each of the wheels. The brake assemblies are typically actuated by hydraulic or pneumatic pressure generated by an operator of the vehicle depressing a foot pedal, pulling a hand lever, and the like. To effect braking action, frictional pads are moved against a braking surface formed in the brake disc or brake drum to frictionally engage therewith. The frictional engagement causes slowing or stopping of the rotational movement of the brake disc or brake drum and, therefore, the wheel of the vehicle in a controlled manner. The structure and operation of the brake assemblies, as well as the actuators therefor, are well known in the art.

There are various known methods of producing a brake drum. For example, brake drums can be formed by a conventional sand-patterned mold casting operation. After cleaning, the brake drum casting is precision drilled and concentrically machined to predetermined dimensional tolerances. For example, an inner cylindrical braking surface can be machined into the cast brake drum. Composite brake drums can be formed by stamping or rolling a generally cylindrical shell and then casting a liner in an inner surface of the shell. The composite brake drum undergoes an additional machining step in which the liner is machined to form a cylindrical inner braking surface.

After the drum brakes have been formed, they typically incorporate a sufficient imbalance which renders the brake drum unsatisfactory for use on a vehicle. As a result, the brake drum is generally subjected to a balancing operation. In the past, brake drums have been balanced by first determining the location and amount of the imbalance using a static balancer, and then welding correcting weights to an outer surface of the brake drum. Brake drums have also been balanced by removing material from a portion of the drum brake. For example, after the imbalance has been located by a static balancer, an operator marks the location of the imbalance on a squealer band of the drum. The squealer band is an integrally raised band formed about the outer surface of the drum. The drum is then transferred to a cutting machine which is operative to make a predetermined cut along a portion of the squealer band to thereby produce a balanced brake drum.

BRIEF SUMMARY OF THE INVENTION

This invention is an improved method for producing a brake drum which balances a brake drum defining an inner surface and an axis. Balancing specifications are determined which correct an imbalance of the brake drum about the axis. The balancing specifications can be determined with the aid of a static balancer. The brake drum is then preferably transferred to a cutting machine where material is removed from the inner surface to balance the brake drum according to the balancing specifications. Preferably, the cutting machine forms a cylindrical surface in the brake drum which defines a braking surface of the brake drum. It is a further feature of the invention to remove material surrounding a pilot hole initially formed in the brake drum, wherein the removal of the material also correlates to the balancing specifications.

Various objects and advantages of this invention will become apparent to those skilled in the art from the following detailed description of the preferred embodiments, when read in light of the accompanying drawings.

DETAILED DESCRIPTION OF THE INVENTION

Figure 1:
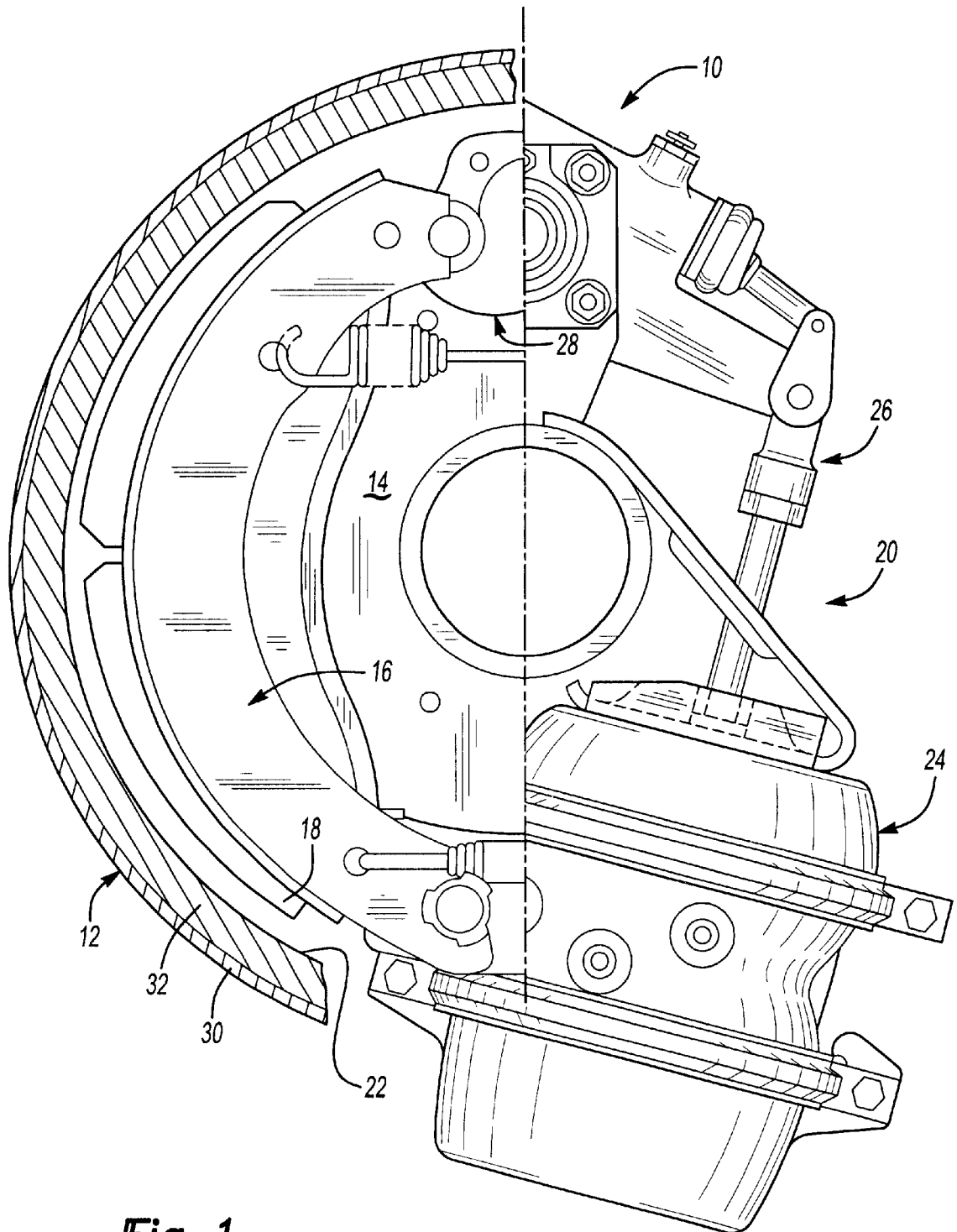
FIG. 1 is a sectional view, partially broken away, of a portion of an improved drum brake assembly, having a first embodiment of a brake drum, produced in accordance with the present invention.

Referring now to the drawings, there is illustrated in FIG. 1, a drum brake assembly, indicated generally at 10. The drum brake assembly 10 includes a first embodiment of a brake drum, indicated generally at 12, produced in accordance with the present invention. The brake drum 12 is a generally hollow cylindrical composite brake drum. The illustrated embodiment of the drum brake assembly 10 is ideally suited for use in heavy duty trucks and trailers. The drum brake assembly 10 includes a backing plate 14 which is secured to a fixed, nonrotatable component of the vehicle, such as the vehicle axle housing (not shown). A pair of opposed arcuate brake shoes 16 (only one brake shoe 16 is shown), are supported on the backing plate 14 for selective movement relative thereto. Each of the brake shoes 16 has a friction pad 18 secured thereto.

The drum brake assembly 10 further includes an actuating mechanism, indicated generally at 20, which selectively moves the brake shoes 16 outwardly apart from one another into frictional engagement with a generally cylindrical inner braking surface 22 of the brake drum 12, as will be discussed in further detail below. The actuating mechanism 20 can any suitable mechanism capable of selectively moving the brakes shoes 16, such as for example, a conventional hydraulic or pneumatic service brake or parking brake mechanism. The illustrated embodiment of the actuating mechanism 20 shown in FIG. 1 includes an air chamber device 24, a lever assembly 26, and an S-cam actuating mechanism 28. To actuate the actuating mechanism 20, pressurized air is supplied to the air chamber device 24 to actuate the lever assembly 26 which in turn, rotates the S-cam actuating mechanism 28 to move the brake shoes 16 apart from one another into frictional engagement with the braking surface 22 of the brake drum 12. A mechanically actuated brake mechanism (not shown) can also be provided for selectively actuating the drum brake assembly 10 in a similar manner.

Figure 2:
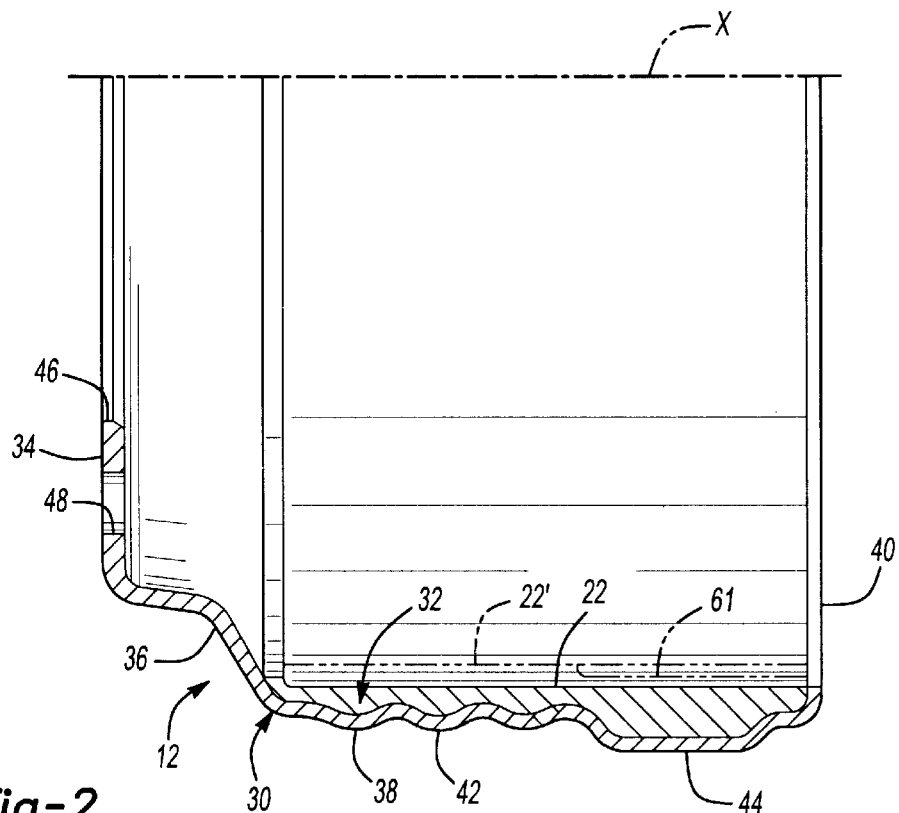
FIG. 2 is a partial sectional view of the brake drum illustrated in FIG. 1.

As shown in FIG. 2, the composite brake drum 12 generally includes a shell, indicated generally at 30, and a liner, indicated generally at 32. The shell 30 and liner 32 can be made of any suitable material, such as steel, aluminum or alloys thereof, aluminum composites, austempered gray iron, or nodular iron. Preferably, the shell 30 is made of steel, and the liner 32 is formed from gray cast iron.

The shell 30 includes a generally closed end or radially extending mounting flange 34, a transition portion 36, a generally axially extending cylindrical main body portion 38, and an opened end 40. The main body portion 38 defines an outer surface 42 including a raised continuously extending annular squealer band 44. The mounting flange 34 includes a generally centrally located pilot hole 46 formed therein, and a plurality of lug bolt holes 48 (only one lug bolt hole 48 shown in FIG. 2), spaced circumferentially around the pilot hole 46. The lug bolt holes 48 are adapted to receive wheel mounting studs (not shown) for securing a wheel (not shown) to the brake drum 12 for rotation therewith.

The shell 30 can be formed by any suitable method, such as by a stamping or rolling process or a combination thereof For example, the shell 30 can be formed by first providing a generally flat sheet of suitable material, such as steel, which is subjected to a stamping operation to produce a generally flat circular blank (not shown) having a pilot hole formed therein. Following this, the blank is subjected to a stamping operation to produce a brake drum preform (not shown) having a desired profile. The blank or preform can then be supported in a suitable fixture, such as for example a well known mandrel-tailstock assembly, and is subjected to an initial forming process. Preferably, a spinning tool is actuated and engages the material in order to spin form a shell portion having a desired profile. Following this the shell portion of the brake drum is subjected to a final forming process wherein a flow forming tool is actuated to engage the material in order to flow form the shell portion of the brake drum against the mandrel and produce a finished shell portion profile 30, such as shown in FIG. 2. Such a process is disclosed in U.S. Pat. No. 5,782,324 to Wall.

The liner 32 can be formed and fixed to the shell 30 by any suitable manner. For example, the liner 32 can be made of gray iron which is cast in the shell 30. The casting of the liner 32 can be accomplished by using a centrifugal casting process. Of course, other casting processes may be used as desired. After the casting of the liner 32, the mounting flange portion 34 of the brake drum 12 is preferably coined, and the first formed pilot hole 46 is formed to a predetermined size along with the forming of the lug bolt mounting holes 48.

Figure 3:
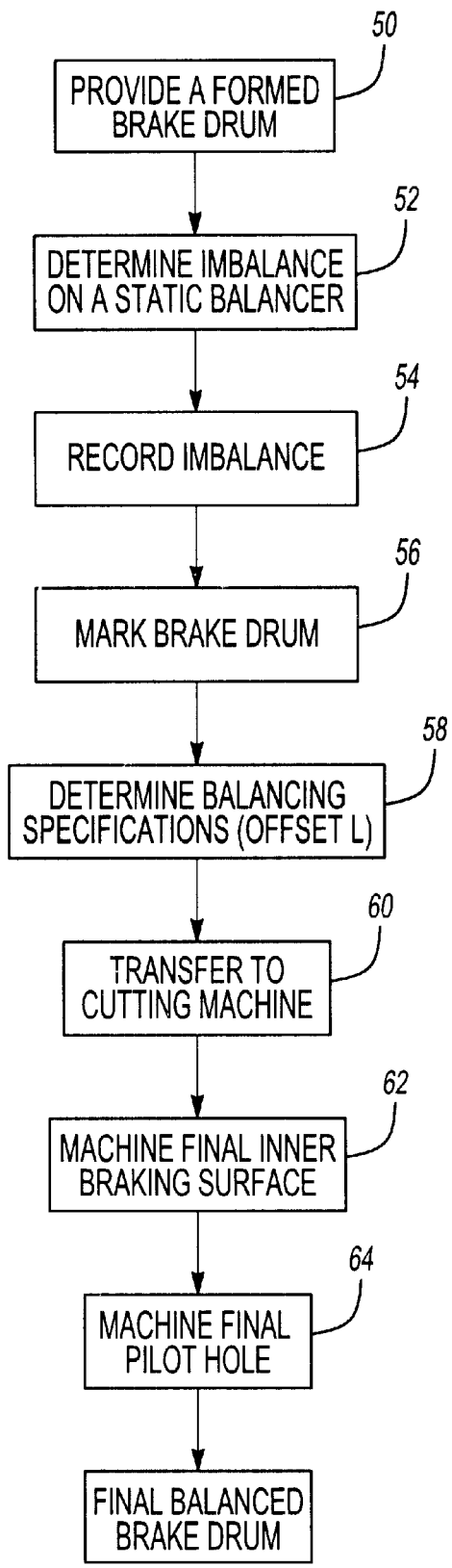
FIG. 3 is a flow diagram illustrating a preferred sequence of steps for producing the brake drum shown in FIGS. 1 and 2.

Turning now to the present invention, the initially formed brake drum 12 (such as being formed by the process described above) typically incorporates a sufficient imbalance which renders the brake drum 12 unsatisfactory for use on a vehicle. This imbalance establishes a light side of the brake drum 12, and an opposite heavy side. To correct the imbalance, the brake drum 12 is subjected to a balancing operation, in accordance with the present invention. Referring to FIG. 3, a preferred sequence of steps for producing the final balanced brake drum 12 will be discussed. Initially in step 50, a formed brake drum, such as the brake drum 12, is first provided. As shown schematically in FIG. 4, the brake drum 12 is preferably provided with a first formed pilot hole 46' formed through the mounting flange 34, and a first formed cylindrical inner braking surface 22' formed in the liner 32. The first formed pilot hole 46' and the first formed braking surface 22' are formed about a drum brake axis X. Note that the shell 30 and the liner 32 were initially formed about the axis X. Preferably, the first formed pilot hole 46' is a relatively precise pilot hole which can be used to center the brake drum 12 during the formation thereof. For example, the first formed pilot hole 46' can be sufficiently precise to receive a jig or fixture (not shown) of a spinner (not shown) for flow forming the shell during the manufacturing thereof.

Figure 4:
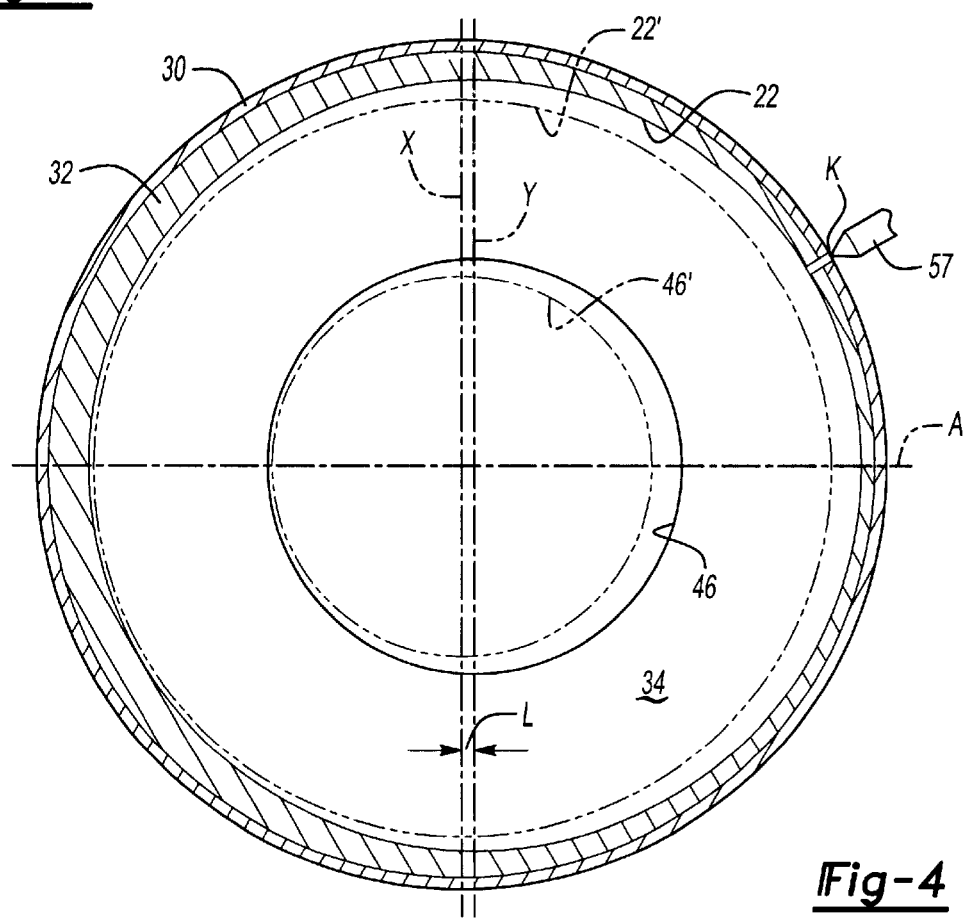
FIG. 4 is a schematical front view representation of the drum brake of FIGS. 1 and 2, illustrating the positions of the first formed pilot hole and braking surface relative to the final formed pilot hole and braking surface formed in accordance with the present invention.

Next, in step 52, the initially formed brake drum 12 is positioned and clamped in place on a balancer (not shown) to determine whether the brake drum 12 has a final balance which is unacceptable. If during step 52 it is determined that the brake drum 12 has an unacceptable balance, the amount of the imbalance, such as by ounce/inch increments, is recorded, as indicated by step 54. The imbalance can be determined by conventional methods which determine the center of mass of the brake drum 12. In step 56, the angular location of the heavy point of the imbalance, denoted by point A in FIG. 4, is marked on the brake drum 12, denoted by point K in FIG. 4, by a recording device (not shown) such as a computer, which is preferably integrated with the static balancer in step 52.

Note that the reference mark K is needed in instances where the brake drum 12 is manually transferred from the balancer to a cutting machine (not shown), as will be discussed below. The reference mark K may be omitted if, for example, the static balancer is incorporated with the cutting device, if the brake drum 12 is manually or automatically transferred to the cutting machine without rotating it from the position which it was located on the static balancer, or if a fully automated transfer system orients the drum on the cutting machine in a predetermined position. Prior to removing the brake drum 12 from the static balancer, the reference mark K can be applied to an outer surface of the brake drum 12 in step 56 by a marking device 57, as shown in FIG. 4.

After the imbalance of the drum brake 12 is determined in step 52, the balancing specifications necessary to correct the imbalance are then determined, as indicated in step 58. In accordance with the present invention, the drum brake 12 is balanced by removing material generally surrounding the first formed cylindrical inner braking surface 22' of the liner 32. Preferably, the material is removed by a cutting machine, such as a lathe, to form the braking surface 22 of the brake drum 12, as shown in FIG. 4. The braking surface 22 is formed about a second axis Y which is offset by a distance L from the axis X. Thus, the balancing specifications necessary to correct the imbalance is the offset or the amount of eccentricity between the axis X and the axis Y. Note that the axis X will typically be parallel to the axis Y.

Preferably, the entire width of the liner 32 is machined so that a uniform braking surface 22 is formed, as shown in FIG. 2. Alternatively, only a portion of the width of the liner 32 may be machined such that a cylindrical surface, indicated by the phantom line 61 in FIG. 2, is formed in the liner 32. The cylindrical surface 61 extends only partly across the width of the liner 32. The final formed braking surface 22, therefore, defines a cylindrical surface extending substantially across the entire width of the liner 32.

Since the braking surface 22 preferably functions as the frictional contact surface for the shoes 16 of the drum brake assembly 10, the inner diameter of the braking surface 22 is generally a known predetermined value. As shown in FIG. 4, the inner diameter of the final formed braking surface 22 is larger than the inner diameter of the first formed braking surface 22'. The inner diameter of the first formed braking surface 22' should be sized appropriately small enough such that a final formed braking surface 22 formed at a maximum offset distance (to compensate for a worst case correctable imbalance) assures that enough stock material surrounds the first formed braking surface 22' so that the inner diameter of the final formed first formed braking surface 22' is within the diameter of the braking surface 22.

Preferably, material is also removed from around the first formed pilot hole 46', about the axis X, to form the final formed pilot hole 46, about the axis Y. The diameter of the final formed pilot hole 46 is larger than the diameter of the first formed pilot hole 46' and should be encompassed thereby. The final formed pilot hole 46 and the final formed braking surface 22 are concentric about the same axis Y. Thus, the balancing specifications (offset L) necessary to correct the imbalance should also account for the material being removed from around the first formed pilot hole 46' and the first formed braking surface 22'. The final formed pilot hole 46 can be formed at a predetermined inner diameter and can be used as a hub hole used in cooperation with a brake hub (not shown) for properly positioning the brake drum 12 centrally about the drum brake assembly 10.

Once the offset L has been determined, the brake drum 12 is transferred and properly positioned on a cutting machine, such as a lathe, as indicated in step 60. Preferably, the cutting machine includes a chuck which uses the first formed pilot hole 46' to orient the brake drum 12 on the cutting machine. A cutting tool (not shown) can then be positioned relative to the offset L. As indicated by step 62, the cutting machine is then operated to remove material from the first formed braking surface 22' of the liner 32 to form a generally cylindrical surface which preferably defines the final formed braking surface 22 of the brake drum 12. As indicated by step 64, the cutting machine is also operated to remove material from around the first formed pilot hole 46' to form the final formed pilot hole 46. If desired, a second balance station may be employed as an audit station to confirm that the finished brake drum 12 is balanced in accordance with desired tolerances.

By forming the final formed braking surface 22 in conjunction with balancing the brake drum 12, the method of the present invention eliminates a step that is otherwise required in conventional production methods which must machine the inner cylindrical braking surface in the drum and then additionally balance the drum by adding weights or performing an additional step of machining material from an outer portion of the drum, such as from the squealer band. Thus, the method of the present invention eliminates a production step, thereby decreasing production time and production costs.

The method of producing the brake drum 12, as described above, is also advantageous over conventional production methods in that a very slight change in the offset L can provide a very significant imbalance correction, due to the relatively large amount of material removed. For example, a conventional method of removing material from the squealer band of a heavy-duty drum may only achieve about 70 inch ounces of correction with a 0.060 inch deep cut. Comparatively, an offset L of 0.0294 inches for a similar sized brake drum can achieve a 200 inch ounce of correction. Also, the method of the present invention does not remove material from the typically highly stressed squealer band 44. In addition, the slight offset L is barely noticeable and provides a more aesthetically pleasing appearance than weights being welded in place or cuts being formed in the outer surface of the brake drum 12.

Figure 5:
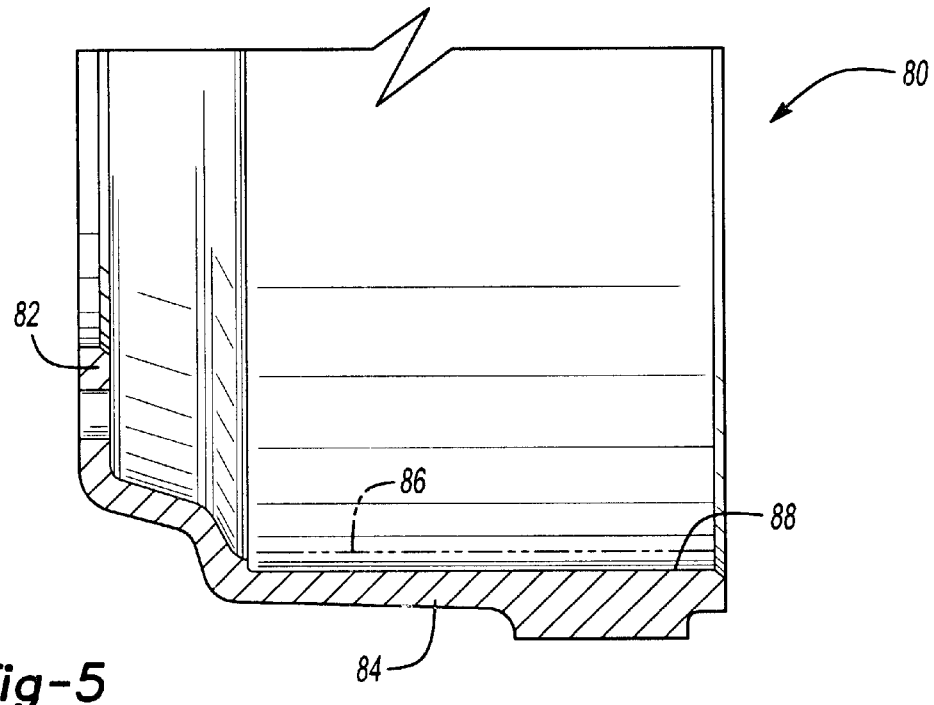
FIG. 5 is a partial sectional view of a second embodiment of a brake drum which can be produced in accordance with the present invention.

Although the invention was described as using the brake drum 12 as shown in FIGS. 1 and 2, it should be understood that other structures of brake drums can be produced in accordance with the present invention. The term "brake drum", as used herein, refers to any brake drum structure having an inner cylindrical braking surface which may or may not be used as a frictional contact surface for engagement with frictional elements of the brake drum assembly. For example, there is illustrated in FIG. 5 a second embodiment of a brake drum 80 which can be produced in accordance with the present invention. The brake drum 80 is formed of a single casting material, such as gray iron. The drum brake 80 includes a mounting flange portion 82 and a generally cylindrical shell portion 84 which are integrally formed from the same casting material. The brake drum 80 can be balanced in accordance with the present invention by removing material from a first formed cylindrical surface, indicated by phantom lines 86, to form a final formed braking surface 88.

Figure 6:
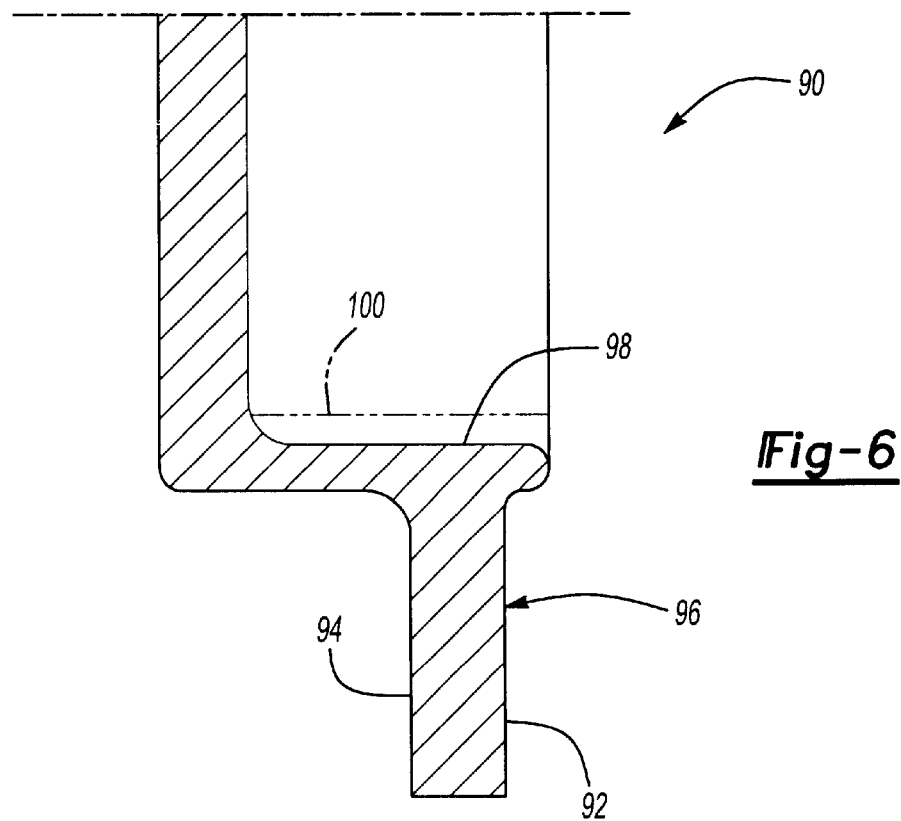
FIG. 6 is a partial sectional view of a third embodiment of a brake drum which can be produced in accordance with the present invention.

In another example, there is shown in FIG. 6 a third embodiment of a brake drum 90 which is adapted for use in a "drum-in-hat" type of brake assembly (not shown), which can be produced in accordance with the present invention. The drum-in-hat brake assembly includes a disc type service brake (not shown) having brake pads which frictionally engage outer surfaces 92 and 94 of an outwardly radially extending rotor portion 96, and a drum type parking and/or emergency brake (not shown) having brake shoes (not shown) which frictionally engage a braking surface 98 of the brake drum 90. The brake drum 90 can be balanced by removing material from a first formed cylindrical surface, indicated by phantom lines 100, to form the final formed braking surface 98.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for producing a brake drum comprising the steps of:
    (a) providing a brake drum defining an inner surface and an axis;
    (b) determining balancing specifications necessary to correct an imbalance of the brake drum about the axis; and
    (c) removing material from the inner surface of the brake drum to balance the brake drum according to the balancing specifications.

2. The method of claim 1, wherein step (b) further includes determining the location and amount of the imbalance relative to a predetermined fixed reference point on the brake drum.

3. The method of claim 2, wherein step (b) further includes providing a reference mark on the brake drum at the predetermined fixed reference point on the brake drum.

4. The method of claim 1, wherein step (b) further includes determining the center of mass of the brake drum with a static balancer.

5. The method of claim 1, wherein step (c) includes forming an inner groove in the inner surface of the brake drum.

6. The method of claim 5, wherein the inner groove is a cylindrical surface formed about the second axis which is offset from the axis defined by the broke drum.

7. The method of claim 6, wherein the second axis is parallel to the axis defined by the brake drum.

8. The method of claim 6, wherein the inner cylindrical surface is formed by mounting the brake drum on a cutting machine for rotation about the second axis and operating the cutting machine to machine the inner cylindrical surface in the inner surface of the brake drum.

9. The method of claim 1, wherein step (c), material is removed from the inner surface of a liner attached to a tubular shell of the brake drum.

10. A method for producing a brake drum comprising the steps of:

(a) providing a brake drum defining an inner surface, the brake drum including a radially extending flange having a pilot hole formed therethrough, the pilot hole having a first diameter and defining an axis of the brake drum;

(b) determining balancing specifications necessary to correct an imbalance of the brake drum about the axis; and (c) Forming an inner groove in the inner surface of the brake drum about a second axis, and machining material adjacent the pilot hole about the second axis to expand the diameter of the pilot hole, wherein the formation of the inner groove and expanding the diameter of the pilot hole balances the brake drum according to the balancing specifications.

11. The method of claim 1, wherein said step (c) includes removing material from a hole formed in a radially extending flange relative to the second axis to balance the brake drum according to the balancing specifications.

12. The method of claim 10, wherein said step (c) includes expanding the diameter of the hole formed in the radially extending flange relative to the second axis to a second diameter greater than the first diameter to balance the brake drum according to the balancing specifications.

13. The method of claim 1, wherein said step (c) includes maintaining a generally cylindrical inner braking surface.

14. The method of claim 1, wherein said step (c) includes removing material from a pilot hole formed in a radially extending mounting flange relative to a second axis.

15. The method of claim 1, wherein said step (c) includes expanding a first diameter of a pilot hole formed in a radially extending mounting flange relative to a second axis to a second diameter greater than the first diameter to balance the brake drum according to the balancing specifications.

16. The method of claim 1, wherein the brake drum defines a concentric inner surface.

17. The method of claim 10, wherein the brake drum defines a concentric inner surface.

18. The method of claim 1, wherein the brake drum defines a uninterrupted inner surface.

19. The method of claim 10, wherein the brake drum defines an uninterrupted inner surface.

20. A method for producing a brake drum comprising the steps of:

(a) providing a brake drum defining an uninterrupted concentric inner surface the brake drum including a radially extending flange having a pilot hole formed therethrough, the pilot hole having a first diameter and defining an axis of the brake drum;

(b) determining balancing specifications necessary to correct an imbalance of the brake drum about the axis; and (c) forming an inner groove in the inner surface of the brake drum about a second axis, and machining material adjacent the pilot hole about the second axis to expand the diameter of the pilot hole, wherein the formation of the inner groove and expanding the diameter of the pilot hole balances the brake drum according to the balancing specifications while maintaining the uninterrupted concentric inner surface.

* * * * *

UNITED STATES PATENT AND TRADEMARK OFFICE
CERTIFICATE OF CORRECTION

PATENT NO.      : 6,532,848 B1
DATED           : March 18, 2003
INVENTOR(S)     : DeRegnaucourt et al.

It is certified that error appears in the above-identified patent and that said Letters Patent is hereby corrected as shown below:

<u>Column 7,</u>
Line 3, "broke" should be -- brake --.

Signed and Sealed this

Tenth Day of June, 2003

JAMES E. ROGAN
*Director of the United States Patent and Trademark Office*